United States Patent [19]

Clot et al.

[11] Patent Number: 4,614,084

[45] Date of Patent: Sep. 30, 1986

[54] LINK DEVICE WITH A PLURALITY OF FREEDOM DEGREES

[75] Inventors: Jean Clot, Saint-Orens; Jean Falipou, Escalquens, both of France

[73] Assignee: Centre National de la Recherche Scientifique (C.N.R.S.), Paris, France

[21] Appl. No.: 641,964

[22] Filed: Aug. 3, 1984

[30] Foreign Application Priority Data

Dec. 17, 1982 [FR] France .................................. 8221389

[51] Int. Cl.⁴ ............................................ B65J 17/02
[52] U.S. Cl. .......................................... 60/325; 414/7; 901/28; 901/29
[58] Field of Search ...................... 414/7, 735; 901/21, 901/27–29, 22; 60/325

[56] References Cited

U.S. PATENT DOCUMENTS

| | | | |
|---|---|---|---|
| 2,780,065 | 2/1957 | Sponnhake | 60/476 |
| 2,927,432 | 3/1960 | Povoy | 92/18 |
| 3,284,964 | 3/1964 | Saito | 901/27 |
| 3,583,752 | 6/1971 | Hugo | 901/29 |
| 4,369,814 | 1/1983 | Humphrey | 901/28 |

FOREIGN PATENT DOCUMENTS 0017016 10/1980 European Pat. Off. .

Primary Examiner—A. Michael Chambers
Attorney, Agent, or Firm—Harold H. Dutton, Jr.

[57] ABSTRACT

Movable link device with a plurality of freedom degrees between a carrier element (manipulator arm or the like) and a carrier element (tool, and particularly gripping tool). The device comprises a support frame (1) adapted to be secured to the carrier element, a movable frame (2) to which the carried element is fixed, a plurality of jacks (5, 6, 7, 7', 8) arranged between the support frame (1) and the movable frame (2) so as to maintain the latter with respect to the former in a relative position as a function of the deformation states of said jacks, and remote control means (13) to control the jacks and comprising a variable capacity tank associated to each jack and forming therewith a closed fluid circuit. The invention is applicable to robotics in order to move a member with high power and precision.

15 Claims, 8 Drawing Figures

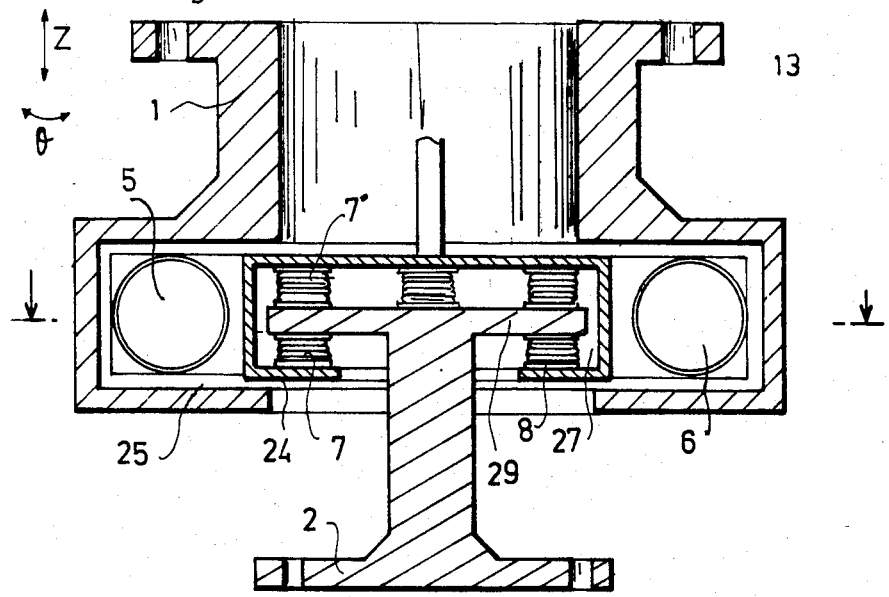
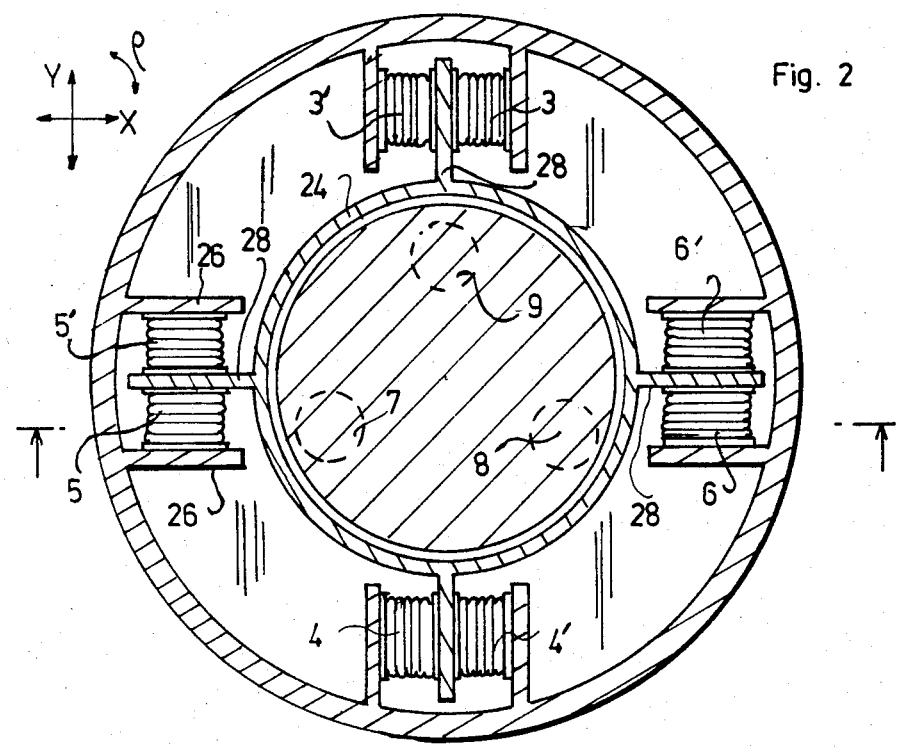

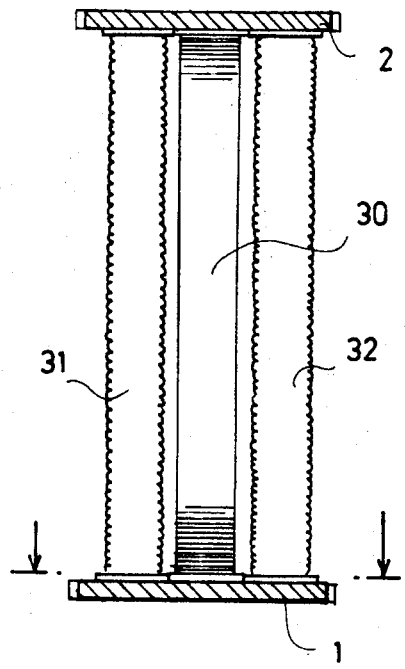
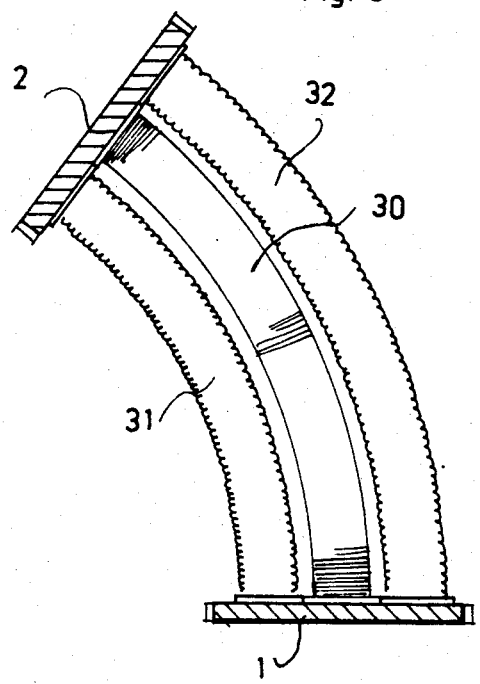
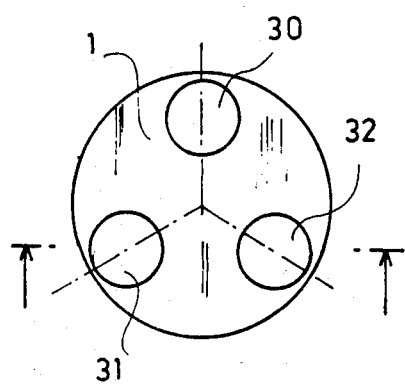

LINK DEVICE WITH A PLURALITY OF FREEDOM DEGREES

The invention concerns a mobile link or coupling between a supported and supporting element. Such a device allows imparting displacements in several degrees of freedom to the supported element with respect to the supporting one.

In the present state of the art, robotics makes use of different types of manipulator arms (hydraulic, pneumatic, electric), that constitute the support element, the supported element being a tool, as a rule being a gripping tool. The force that the arm can exert is rather incompatible with its operational speed and especially with accuracy of displacement: The band or cable operated manipulator arms evince good accuracy but their force is limited, whereas the hydraulically actuated arms are powerful but often lacking in accuracy. This problem has been partly resolved by providing the manipulator arm with a flexible coupler means, for instance a Nevins wrist, which can deform under stress of which it indicates both the magnitude and the direction. It is also necessary that the arm be capable of low amplitude displacements performed with high accuracy in order to assemble as desired. Again it has been suggested to build arms with wrists performing high accuracy displacements of low amplitudes, but such require a large number of motors equipped with heavy and bulky reducer means which correspondingly decrease the arm's power.

Elsewhere the European patent No. 017016 and the U.S. Pat. No. 3,284,264 disclose "elephant trunk" devices which can be powered hydraulically; these devices however incur the drawback of requiring external pressurizing systems such as compressors or the like, with the position of the various elements of said devices depending on an external pressure of which the accurate control will always demand great care.

The main object of the present invention is to palliate the drawbacks of the known devices by creating a mobile link or coupling making possible powerful displacements with good accuracy.

Another object of the present invention is to create a link or coupling with a lesser weight than those of the prior art.

Another object of the present invention is to create a link or coupling permitting displacements of fine enough a resolution to be mounted on any manipulator arm (and hence of low cost).

Another object is to create a link or coupling allowing displacements of sufficient amplitude of the supported element with respect to the supporting element, with operational speed and accuracy higher than for the manipulator arms of the prior art.

The mobile link or coupling object of the invention includes:

a bearing framework designed to be fixed on the supporting element (manipulator arm), a mobile framework designed to permit fastening the supported element (last member), a plurality of flexible jack means each with a deforming wall extending about a so-called longitudinal axis, and rigid fastening walls located at each end of said deforming wall, said flexible jack means being arranged between the bearing framework and the mobile framework so as to keep said mobile framework in a relative position to said bearing framework depending on the deformation states of said flexible jack means;

and remote control means for the flexible jack means.

In one feature of the present invention, the remote control means include a variable-capacity tank which is associated with and connected to each of said flexible jack means with which it forms a closed fluid circuit, said control means being designed to determine in the set of variable-capacity tanks such capacities as would generate a set of deforming states in the flexible jack means in order to achieve this desired position of the mobile framework.

In view of its design, such a device therefore allows accurately positioning the supported element when starting from an approximate end position of the supporting element by means of displacements generated by actuating flexible jack means. The jack means are operated by varying the capacities of each of the tanks associated with the jacks. It is essential to bear in mind that the hermetic and closed fluid circuit with which each jack is associated eliminates the implementation of external pressurizing systems and provides the device of the invention with a neutral equilibrium position which is independent of any external pressure.

In another feature of the invention, each flexible jack means is provided with means measuring the state of its deformation which are connected to the above stated remote control means in order to achieve a closed-loop adjustment of the displacement of the mobile framework with respect to the bearing framework.

Said measuring means make it possible, following the approximate positioning of the supporting element, to determine the magnitude and direction of the constraints applied to the supported element and to control the drive means for the flexible jack means in order to implement the desired assembly by accurately positioning the supported element.

Another feature of the device of the invention is that each variable-capacity tank includes a plurality of elements with a deforming wall driven by electromagnets, the dimensions of each element being fitted so that the variations in capacity be in a binary ratio in order to control them by a numeric system.

In another feature of the invention, the flexible jack means may have heights which are large compared to their diameters.

In this manner it is possible to achieve high-amplitude displacements between the supported and the supporting element. Such a device per se constitutes a manipulator arm merging the power of the hydraulic systems with the accuracy of the device described in the above paragraphs.

The invention shall be more clearly understood from the description below in relation to the attached drawings which show in illustrative and non-limiting manner preferred modes of embodiment.

These drawings are an integral part of the invention.

FIG. 1 is a radial section of the assembly wrist of the invention,

FIG. 2 is a cross-section of the same assembly wrist,

FIG. 6 is a longitudinal section of a hydraulic arm of the invention, FIG. 7 is a cross-section of the same arm, and FIG. 8 is a view of the same arm when in the deformed position.

The assembly wrist shown in FIGS. 1 and 2 includes a bearing framework 1 to be fixed by any means known per se to the end of a supporting element such as a manipulator arm (omitted). Said wrist further includes a mobile framework 2 (or mobile carriage) on which it is possible to fix in manner known per se a supported element, for instance an assembly tool or a gripping tong (omitted). A plurality of flexible jacks 3, 3', 4, 4', 5, 5', 6, 6', 7, 7', 8, 8', 9 and 9' are mounted between the two said frameworks.

Figure 3:
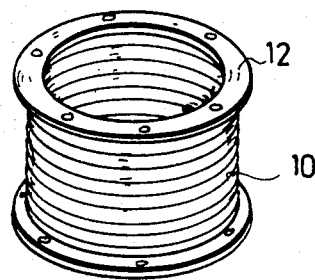
FIG. 3 is a perspective of a flexible jack used in the invention.

As shown by FIG. 3, these jacks consist of a substantially cylindrical body 10, with a flexible wall and in accordion shape, which is solidly joined at each end to a rigid fastening ring 12. At rest the flexible wall extends around a longitudinal axis 11. Preferably, these jacks are hydraulic and operate as follows: when a volume of oil exceeding the rest volume of said jack is introduced in it, the deforming wall 10 stretches and thereby further separate the fastening rings 12. Conversely, withdrawing a volume causes a shrinking of the deforming wall 10 and hence the fastening rings 12 come closer to each other.

Control means 13 allow actuating the jacks. These control means 13 include a variable-capacity tank (shown in FIG. 4) each associated with and connected to each jack and comprising a rigid-wall container 14 to which is connected at least one deforming-wall element similar to the flexible jacks described above but of which the fastening ring at one end is closed. These deforming-wall elements are equipped with drive means solidly joined to the closed end. A change in tank capacity ensues therefore from a displacement of that end.

Figure 4:
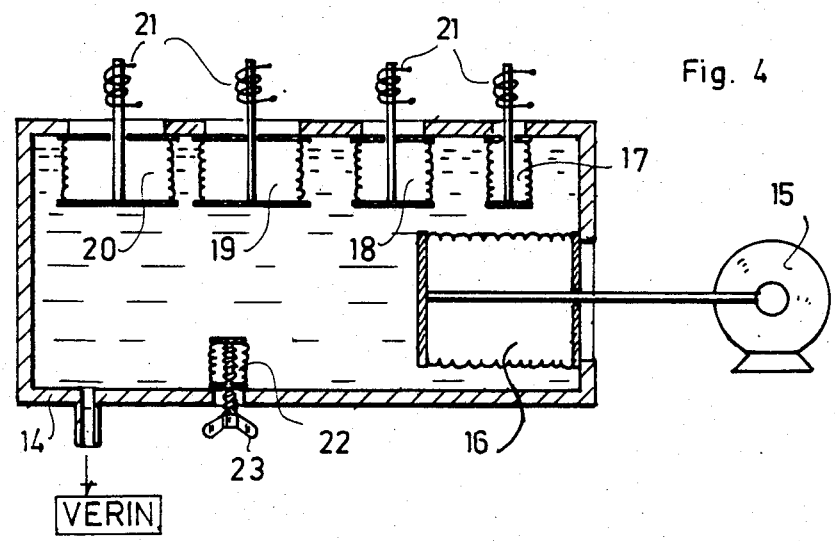
FIG. 4 is a schematic section of a variable-capacity tank of the invention.

FIG. 4 shows several embodiments of these drive means. A stepping motor 15 drives the free but closed end of the deforming-wall element 16. This latter element preferably evinces a rest volume equal to that of the associated flexible jack. When the closed but free end of the element 16 is displaced by the motor 15, a change in tank capacity ensues. Increasing or decreasing the amount of oil in the tank causes a decrease or an increase of oil in the flexible jack which is actuated thereby. It is possible too to actuate the flexible jack using a plurality of deforming-wall elements 17, 18, 19, 20 of which the volumes are in binary ratios, i.e., the volume of element 17 is half that of the element 18, which in turn has a volume half that of element 19 of which the volume is half that of element 20. Herein these elements are illustratively but without implying restriction shown being four and are actuated by electromagnets 21 of which the energization is controlled by a numeric system. If the volume of the element 17 is 1/15th of the volume of the associated flexible jack, the control of the electromagnets 21 by means of a binary numeric system allows the stepwise displacement of the supported element 2 with respect to the supporting element 1 at a step corresponding to 1/15th the possible displacement amplitude.

Because the liquids are not wholly incompressible and as they may undergo volume variations due to changes in temperature, a small deforming-wall element 22 may be provided, which is controlled by a screw 23 for any compensatory adjustment.

Each flexible jack is provided with measuring means (omitted) for the state of its deformation. These measuring means make it possible to precisely determine the accurate position of the supported element. These measuring means are connected to the control means 13 for the drive mans 15, 21 of the deforming-wall elements and also permit to carry out an extremely accurate closed-loop dimensional control. These measuring means for instance may be based on capacity detection, or they may; be an optical system with optical fibers or photocells, or else an ultrasonic system using the phase or the pulse mode. Obviously, these measuring means are known per se and are provided here only illustratively without thereby implying restriction, and other means may be used.

It may be especially significant to be operating in the differential mode, with the assembly already being biased or pre-stressed when at rest, so as to minimize spurious deformations.

Figure 5:
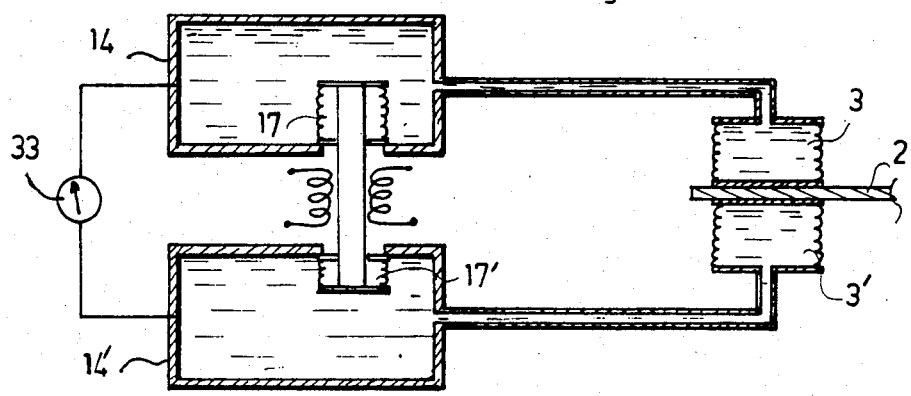
FIG. 5 is a schematic section of a set of variable-capacity tanks and flexible jacks, said tanks operating differentially.

Such an assembly is shown in FIG. 5. In that figure, two flexible jacks 3, 3' are actuated by two variable-capacity tanks 14, 14' comprising at least one deforming-wall element 17, 17' actuated by a double-action electromagnet with two drive coils. The energization of one of these coils causes the capacity of one of the tanks to increase and a drop in the capacity of the other tank. These capacity changes cause a drop in the height of the jack associated with the second tank. The mobile framework 2 which is solidly joined to the ends near the two jacks therefore moves due to the changes in heights in the two jacks.

Beyond the measuring means for the state of the deformations of each jack designed to control the drive means for the deforming-wall elements of the variable-capacity tanks, a pressure detector 33 is placed between the two tanks for the following purpose: if the mobile framework 2 undergoes a constraint, a pressure difference may be created within the tanks which is a function of the magnitude and the direction of the constraint. The jacks 3 and 3' being arranged to cause a displacement of the mobile framework 2 in a given direction, the pressure difference sensed between the tanks also indicates the direction of said constraint. This indication makes it possible to control drive means and when the pressure difference becomes zero, it is reliably known that the mobile framework has reached the desired position.

An intermediate frame 24 is provided in the embodiment of the assembly wrist shown in FIGS. 1 and 2. The bearing framework 1 includes a hollow body 25 of which the inner sides are equipped with fastener means 26 for the rigid walls of the flexible jacks. It is seen in FIG. 2 that these fastener means are eight, forming four pairs arranged mutually at 90°. One end of the flexible jacks 3, 3', 4, 4', 5, 5', 6 and 6' is mounted to these fastener means. The intermediate frame 24 also comprises a hollow body 27 and its outer sides are provided with fastener means 28 for the rigid walls of the flexible jacks. FIG. 2 shows that there are four fastener means of the latter arranged mutually at 90°. The intermediate frame 24 is arranged within the hollow body 25 of the bearing framework 1 in such a manner that the fastener means 28 are inserted between the flexible jacks 3 and 3', 4 and 4', 5 and 5', 6 and 6'.

The mobile framework 2 includes a disk means 29 on both sides of which are fixed one of the rigid walls of the flexible jacks 7, 7', 8, 8', 9, 9'. The other rigid wall of these jacks is fixed within the hollow body 27 of the intermediate frame 24. These jacks are distributed on either side of the plate means 29 at an angle of 120°.

In the embodiment described in relation to FIGS. 1 and 2, a jack with a particular reference and another with the same reference followed by a ' sign constitute a differential set as described in relation to FIG. 5.

The flexible jacks are distributed in three sets of which the operation will now be explained in detail: a first set Gx consists of the jacks 3, 3', 4, 4'; a second set Gy consists of the jacks 5, 5', 6, 6'; and a third set Gz consists of the jacks 7, 7', 8, 8', 9, 9'. When all the jacks of the set Gx are actuated so that the jacks 3 and 4 on one hand and 3' and 4' on the other undergo a deformation in the same direction, the intermediate frame 24 bearing the mobile framework 2 moves along a direction X in FIG. 2. Similarly, when all the jacks of the Gx set are actuated so that the jacks 5 and 6 on one hand and 5' and 6' on the other under a same-direction deformation, the intermediate frame 24 moves in a direction Y shown in FIG. 2. Again when the three jacks 7, 8, 9 on one hand and 7', 8', 9' on the other are actuated to undergo same-direction deformations, the mobile framework 2 moves in a direction Z shown in FIG. 1. The displacements along the X, Y, Z directions are linear.

When the jacks of the sets Gx and Gy are actuated simultaneously so that the deformations undergone on one hand by the jacks 3, 6, 4', 5' and on the other 3', 6', 4, 5 are in the same direction, the intermediate frame moves rotationally about the bearing framework 1 as indicated by $\rho$ in FIG. 2. Similarly a differential actuation of the jacks of the Gz set entails an oscillatory displacement of the mobile framework 2 with respect to the intermediate frame 24 along three directions, of which one is denoted by $\theta$ in FIG. 1. In this manner a mobile link or coupling system with seven degrees of freedom is obtained and accordingly, by individually controlling each differential jack system, it is possible to carry out displacements in all directions.

In the case of the mobile assembly wrist described just above, the displacements required by the supported element with respect to the supporting element are only of slight amplitudes. The displacement magnitude being determined by the deformation of the side wall of the jacks in the direction of their height, this displacement shall be slight and in any even less than the diameter of said jacks.

The FIGS. 6 through 8 describe a mobile link or coupling making it possible to force large-amplitude displacements on the supported element with respect to the supporting element. Such a device constitutes a hydraulic manipulator arm.

FIG. 6 shows the bearing framework 1 and the mobile framework 2 both consisting of disks. The framework 1 is to be mounted in fixed manner on a support casing (omitted). A work tool (omission of supported element) is fixed on the mobile framework 2. Three jacks 30, 31, 32 are fixed by their fastening rings between the frameworks 1 and 2. A variable-capacity tank similar to that described above is associated with each jack and connected to it. Each jack furthermore is provided with means for measurements. These three jacks are distributed on the frameworks at mutual spacings of 120° so that their axes are parallel to one direction when at rest. As the displacements wanted in this case are of large amplitudes, the jacks 30, 31, 32 evince heights much exceeding their diameters.

The differential actuation of each of the three jacks generates displacements depending on the state of deformation of each jack. In this manner, a great many spatial positions can be achieved.

It is obvious that one or more intermediate frames can be arranged between the bearing framework 1 and the mobile framework 2, a set of three jacks being arranged between two neighboring frame means, and as a result, the number of positions which can be assumed by the supported element is increased.

A great advantage of the mobile links or couplings described above is that the jacks can be remote-controlled, being connected to the control means by a harness of electric measurement cables and hydraulic conduits.

Be it noted that the device of the invention can be used to rotate manipulator arms (or any other member) while capable of driving large loads; it requires no more than to suitably connect a given point of the mobile framework in order to impart to it a circular motion.

Again, it is possible to impart a reciprocating motion to the mobile framework by means of cyclically controlling the jacks.

We claim:

1. A mobile link or coupling having a plurality of degrees of freedom, between a supporting element and a supported element, where the supported element may be moved with respect to the supporting element, comprising:

a bearing framework (1) adapted to be fixed on the supporting element and a mobile framework (2) adapted to allow fastening the supported element;

a plurality of flexible jack means (3, 3', 4, 4', 5, 5', 6, 6', 7, 7', 8, 8', 9, 9', 30, 31, 32) each comprising a deforming wall (10) extending about a longitudinal axis (11), and rigid fastening walls (12) located at each end of said deforming wall (10), said flexible jack means being arranged between the bearing framework (1) and the mobile framework (2) so as to keep said mobile framework (2) in a position with respect to said bearing framework (1) according to the set of deformation states of said flexible jack means, remote control means (13) for said flexible jack means, said remote control means (13) including a variable-capacity reservoir associated with and connected to each of said flexible jack means and forming with said flexible jack means a closed fluid circuit, said remote control means (13) being adapted to impart to the set of variable-capacity reservoirs capacities which determine a set of deformation states of the flexible jack means for achieving the desired position of the mobile framework (2), each of said variable-capacity reservoirs comprising at least one deforming-wall element (16, 17, 18, 19, 20, 22) including means (15, 21, 23) for driving said deforming wall for enabling a change in reservoir capacity, and each flexible jack means including means connected to said remote control means for measuring the deformation state and for providing a closed-loop adjustment of the desired displacement of the mobile framework (2) with respect to the bearing framework (1).

2. Link or coupling according to claim 1, wherein the drive means for the deforming wall (16) of the variable-capacity reservoir include a stepping motor (15).

3. Link or coupling according to claim 1, characterized in that the reservoir includes a plurality of elements (17, 18, 19, 20) with a deforming wall driven by electromagnets (21), the dimensions of each of said elements being determined such that the changes in capacity will be binary ratios for the purpose df being numerically controlled.

4. Link or coupling according to claim 1, wherein the fluid used in a liquid and the flexible jack means comprises hydraulic jacks.

5. Link or coupling according to claim 1, including at least one intermediate frame (24) arranged between the bearing framework (1) and the mobile framework (2), a portion of said flexible jack means being fixed by one of their rigid walls to said bearing framework (1) and by the other rigid wall to said intermediate frame (24), the other part of the flexible jack means being fastened by one of their rigid walls to the intermediate frame (24) and by the other rigid wall to the mobile framework (2), said flexible jack means being distributed in three sets and arranged such that the longitudinal axis of the jacks of each of the sets are parallel to three different directions when at rest.

6. Link or coupling according to claim 5, including:
a first set (Gx) of flexible jack means (3, 3', 4, 4') arranged between the bearing framework (1) and the intermediate frame (24) with their axis parallel to a direction X,
a second set (Gy) of flexible jack means (5, 5', 6, 6') arranged between the bearing framework (1) and the intermediate frame (24) with their axis parallel to a direction Y,
and a third set (Gz) of flexible jack means (7, 7', 8, 8', 9, 9') arranged between the intermediate frame (24) and the mobile framework (2) with their axis parallel to a direction Z perpendicular to the plane formed by the directions X and Y.

7. Link or coupling according to claim 6, characterized in that:
the bearing framework (1) comprises a hollow body (25) of which the inner sides are provided with fastener means (26) for the rigid fastening walls of the flexible jack means of the sets (Gx) and (Gy),
the intermediate frame (24) comprises a hollow body (27) arranged within the bearing framework (1) and of which the outer sides are provided with fastener means (28) for the other rigid walls of the flexible jack means of the sets (Gx) and (Gy),
and the mobile framework (2) comprises a disk (29) arranged with the intermediate frame (24) for the purpose of fastening the flexible jack means of the set (Gz) between the mobile framework (2) and the intermediate frame (24).

8. Link or coupling according to claim 1, characterized in that each set comprising a flexible jack means and variable-capacity reservoir is associated with a second set comprising a flexible jack means and a variable-capacity reservoir arranged in such a manner as to form a differential system with said first set.

9. Link or coupling according to claim 8, characterized in being provided with means for measuring the magnitude and the direction of the constraints existing on the supported element, said measuring means including a pressure sensor (33) arranged between the two variable-capacity reservoirs (14, 14') of a differential system.

10. Link or coupling according to claim 1, wherein the flexible jack means and the deforming-wall elements of the variable-capacity reservoirs comprises of a substantially cylindrical body (10) with an accordion-shaped flexible wall, and solidly joined at each end to a rigid fastening ring (12).

11. Link or coupling according to claim 1, for imparting low-amplitude displacements to the supported element with respect to the supporting element, wherein the flexible walls of the flexible jack means have a height less than their diameter even for the position of maximum stretching.

12. Link or coupling according to claim 11, characterized by forming a mobile assembly wrist, the supporting element comprising a mechanical or hydraulic manipulator arm at the end of which is fixed the bearing framework (1), the supported element being an operational tool, in particular a gripping tong mounted on the mobile framework (2).

13. Link or coupling according to claim 1, for imparting large-amplitude displacements to the supported element with respect to the supporting element, characterized in that the flexible walls of the flexible jack means have heights exceeding their diameter even for the position of maximum compression.

14. Link or coupling according to claim 13, characterized in that the flexible jack means are distributed in three sets (30, 31, 32) arranged mutually at 120° on the supporting element so that the axes of the jacks of each set are parallel to the same direction when at rest.

15. Link or coupling according to claim 1, wherein the variable-capacity reservoirs are arranged at a distance from the flexible jack means to which they are connected by a harness (34) of hydraulic conduits controlling the flexible jack means and of electric cables measuring the state of deformation of said jack means.

* * * * *